United States Patent [19]

Steigelman

[11] 4,112,180
[45] Sep. 5, 1978

[54] REFRACTORY METAL CARBIDE ARTICLES AND LAMINATING METHOD FOR PRODUCING SAME

[75] Inventor: James Q. Steigelman, Athens, Pa.

[73] Assignee: GTE Sylvania Incorporated, Stamford, Conn.

[21] Appl. No.: 511,441

[22] Filed: Oct. 2, 1974

[51] Int. Cl.² ............................ B32B 3/10; B22F 3/00
[52] U.S. Cl. .................................... 428/332; 75/203; 428/551
[58] Field of Search ......................... 29/182.8, 182.7; 75/203, 204; 428/332, 339

[56] References Cited

U.S. PATENT DOCUMENTS

| | | | |
|---|---|---|---|
| 3,403,009 | 9/1968 | Bergstrom | 29/182.7 |
| 3,489,532 | 1/1970 | Masuyama | 75/204 |
| 3,490,901 | 1/1970 | Hachisuka | 75/203 |
| 3,542,529 | 11/1970 | Bergna | 75/203 |
| 3,677,722 | 7/1972 | Rymas | 29/182.8 |
| 3,695,960 | 10/1972 | Richter | 156/89 |
| 3,725,186 | 4/1973 | Lynch | 156/89 |
| 3,790,353 | 2/1974 | Jackson | 29/182.7 |

FOREIGN PATENT DOCUMENTS

| | | |
|---|---|---|
| 931,096 | 7/1963 | United Kingdom. |
| 1,274,211 | 5/1972 | United Kingdom. |
| 1,274,212 | 5/1972 | United Kingdom. |

Primary Examiner—Samuel W. Engle
Assistant Examiner—Donald P. Walsh
Attorney, Agent, or Firm—Norman J. O'Malley; John C. Fox; Donald R. Castle

[57] ABSTRACT

Sintered and unsintered articles of refractory metal carbide and cementing metal having thicknesses greater than those obtainable by tape casting a slurry of ingredients onto a substrate, and having a cross section of substantially uniform appearance, are described, as well as a laminating method for producing such articles, the method comprising; (1) pressing the top surface of one or more unsintered flexible tape cast sheets against a smooth rigid surface to achieve a top surface smoothness comparable to the bottom surface smoothness achieved by tape casting, and (2) forming a laminate of at least 3 unsintered flexible tape cast layers by bringing the respective smooth surfaces of the layers into mutual contact and pressing the layers together to achieve bonding.

3 Claims, 2 Drawing Figures

REFRACTORY METAL CARBIDE ARTICLES AND LAMINATING METHOD FOR PRODUCING SAME

BACKGROUND OF THE INVENTION

This invention relates to thin cemented refractory metal carbide articles having uneroded formed surfaces, and also relates to thin flexible unsintered articles of carbide and cementing metal articles suspended in an organic matrix and to a laminating process for producing such sintered and unsintered articles.

Copending patent applications Ser. No. 488,727, filed July 15, 1974 and Ser. No. 418,397, filed Nov. 23, 1973, both assigned to the present assignee, described techniques for producing thin flexible sheets of metal carbide and binder metal suspended in an organic matrix by tape casting a slurry of the ingredients in a solvent, which flexible tapes may be subsequently formed into thin cemented carbide articles by shaping and firing. Since in general it is difficult to achieve cemented carbide articles in thicknesses less than about ⅛ inch by conventional pressing and sintering techniques, the above tape casting techniques are significant in that they enable the production of articles less than ⅛ inch in thickness directly without the necessity for extensive grinding or milling operations to obtain desired small thicknesses.

However, there is an upper limit to tape cast thicknesses obtainable by these techniques of about 0.040 inches. One method employed in the ceramics industry to produce article thicknesses greater than those obtainable by tape casting is to laminate two or more tape cast layers, for example by hot pressing or calendaring through rollers. A multi-laminating technique is described for example; in U.S. Pat. No. 3,725,186. However, such techniques in general result in poor bonding between the layers and in extreme cases result in delamination.

U.S. Pat. No. 3,695,960 discloses a method for improving such bonding between two tape cast layers by bringing the smooth bottom casting surfaces of these two layers into mutual contact prior to lamination and firing. While this technique has been found to improve bonding between tape cast carbide layers, nevertheless where it is desired to form laminates of more than two layers, the obvious problem arises that insufficient smooth casting surfaces are available to achieve mutual contact of smooth surfaces at each layer interface, so that in multi-layer laminates only the casting surfaces of alternate layers can be in contact, giving rise to poor bonding or delamination between adjacent layers.

SUMMARY OF THE INVENTION

In accordance with the invention, it has been discovered that by pressing the top surface of a flexible unsintered tape cast carbide sheet against a rigid surface having a smoothness at least equivalent to the smoothness of the surface of the casting substrate, a top surface smoothness may be achieved which is equivalent to the bottom cast surface, thus allowing the formation of laminates of more than two of these sheets, the laminates having cross sections, which exhibit a substantially uniform appearance across their thickness, which cross sections are substantially free from discontinuities corresponding to the interfaces between layers, both for laminates of the unsintered layers and sintered articles produced therefrom.

Thus in accordance with one embodiment, the invention provides a cemented carbide article having a predetermined configuration including at least one portion having a thickness of greater than about 0.060 inch defined by at least two uneroded formed surfaces and characterized by having a cross section through said surfaces of substantially uniform appearance across said thickness.

In accordance with another embodiment, the invention further provides a self-supporting flexible multi-laminate of tapes or sheets of a composition comprising from about 75 to about 97 weight percent of an inorganic portion consisting essentially of discrete particles of one or more refractory metal carbides and particles of one or more lower melting metallic cementers or binders, and from about 3 to 30 weight percent of an organic portion, the multi-laminate having a thickness of greater than about 0.080 inch defined by at least two uneroded formed surfaces and characterized by having a cross-section through said surfaces of substantially uniform appearance across said thickness.

In a further embodiment, the invention provides a process for laminating at least three self-supporting flexible tape cast tapes or sheets, comprising pressing the top surface of at least one of such tapes or sheets against a rigid surface having a surface smoothness at least equivalent to the smoothness of the casting substrate surface at a pressure and for a time sufficient to achieve a top surface smoothness of the tape or sheet substantially equivalent to the bottom as-cast surface, and laminating at least three tapes or sheets wherein smooth surfaces of the sheets are in mutual contact at each layer interface between laminated layers. As used herein, the term laminating is meant to refer to a two-step process in which at least two layers, each having at least one smooth surface are brought into contact with one another and pressed together to achieve an intimate bond between the smooth surfaces. Thus, forming laminates in accordance with the method of the invention may take any of several combinations of alternate contacting and pressing steps of one or more of the layers. For example, since each tape cast layer has a smooth bottom cast surface, at least two such layers may be contacted and pressed to simultaneously bond the bottom cast surfaces and achieve top surface smoothnesses required for bonding to a third layer.

The resulting self supporting flexible materials can thereafter be heated to temperatures necessary to successively remove the solid organic constituents and form the refractory metal cemented carbide article.

As used herein, the term refractory metal cemented carbide means a unitary body consisting of discrete particles of from about 75 to 97 weight percent of a refractory metal carbide cemented together, usually by liquid phase sintering, with from about 3 to 25 weight percent of a lower melting metallic binder, normally one of the iron group metals. A typical cemented carbide would be tungsten carbide cemented with from 6 to 12 percent by weight of cobalt. Low melting alloys may also be used as the cementing phase. For example, a group known generically as brazing alloys may be used for this purpose in some application.

DETAILED DESCRIPTION OF THE INVENTION

Figure 1:
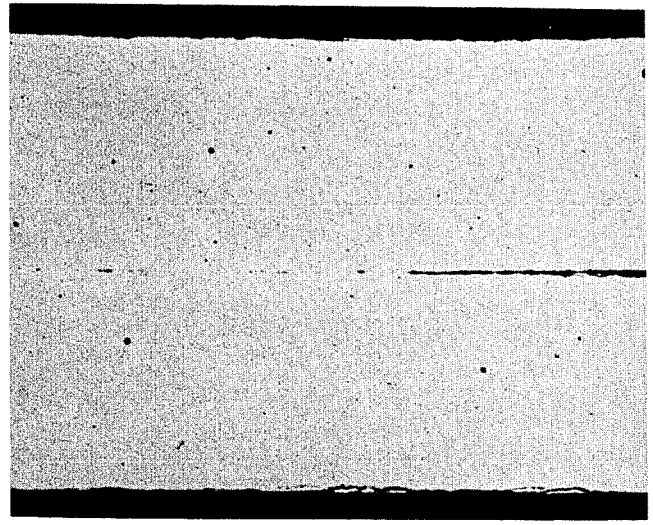
FIG. 1 is a photomicrograph showing in cross section at a magnification of about 75 times a dewaxed and fired laminate of two tape cast sheets of carbide produced in accordance with the prior art, illustrating a bond line fault.

For a better understanding of the present invention, together with other and further objects, advantages and capabilities thereof, reference is made to the following disclosure and appended claims in connection with the above described drawings.

Materials which benefit from the teaching of this invention are the cemented refractory metal carbides which are produced by mixing particles of a refractory metal carbide, for example, TiC, ZrC, HfC, VC NbC, TaC, MoC, and WC, with particles of a material which can be melted at a temperature appreciably below the melting point of the carbide material, for example, from about 200° C to 1300° C lower, so that upon heating above the melting point of the lower melting metal it consolidates the mixture by wetting, dissolving, and adhering to the discrete carbide particles and upon cooling solidifies to bind the carbide particles together into a unitary structure. This heating must be carried out in a nonoxidizing atmosphere, for example in a neutral or reducing atmosphere such as vacuum, nitrogen, hydrogen, etc., in order to prevent alterations in the stoichiometry and/or structure of the carbide particles or cementing matrix. For purposes of the invention refractory metals are those having melting points of 1600° C or above.

For a detailed description of procedures for producing the self supporting flexible tapes or sheets useful in forming the laminates of this invention, reference may be had to the teachings of co-pending patent applications Ser. No. 488,727 filed July 15, 1974 and Ser. No. 418,397 filed Nov. 23, 1973, both assigned to the present assignee. However, successful practice of the invention does not depend upon production of such tapes or sheets by the above methods. Other techniques are also satisfactory, for example, rolling a powder mixture of carbide and binder metal particles together with solid particles of an organic binder to produce a consolidated flexible sheet of the material. In such cases, it may be necessary to press both sides of the sheet to achieve sufficient smoothness for bonding. Such smoothness would be that which is at least equivalent to that achieved by tape casting a slurry of ingredients onto a conventional substrate, such as Mylar, a DuPont tradename for a polyester, or cellulose acetate.

In a preferred embodiment, articles of the invention may be produced by forming a triple laminate of unsintered flexible tape cast sheets formed by tape casting a slurry of ingredients including organic resins, binders and solvents onto a Mylar substrate. After solvent evaporation the tapes may be peeled from the substrate, cut to the desired size if required, and two or the sheets contacted by placing their bottom as-cast surfaces respectively together and pressing these layers between top and bottom Mylar sheets backed by rigid pressing plates in order to simultaneously bond these two layers together and smooth their exposed top surfaces, thereafter applying a third sheet by contacting its bottom as-cast surface to either of the now-smooth top surfaces of the two layer laminate, and thereafter pressing to effect the second bond and thus form the triple laminate.

Figure 2:
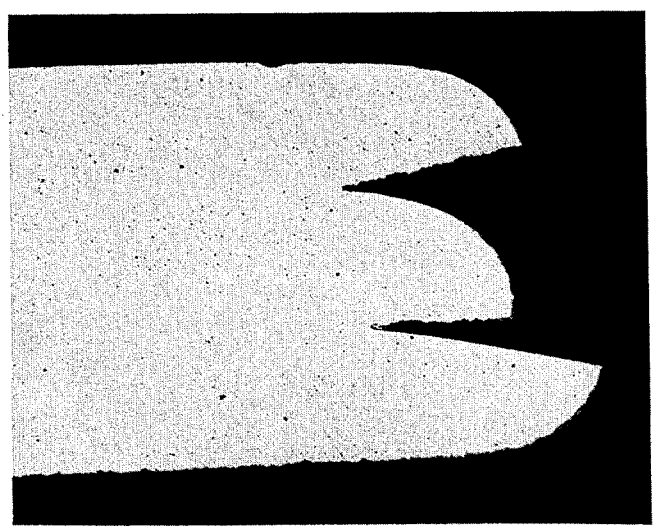
FIG. 2 is a photomicrograph showing in cross section at a magnification of about 40 times a dewaxed and fired laminate of three carbide tapes produced in accordance with the invention, illustrating the substantial lack of bond line faults or other evidence of interface faults between the layers.

The triple laminate shown in cross-section in FIG. 2 was prepared by the above procedure, dewaxed and sintered, and contains no flaws in either bond line. For comparison, a double laminate was prepared by contacting the top surfaces of two tape cast sheets which had not been previously smoothed, pressing, dewaxing and sintering. As is shown from the cross-section shown in FIG. 1, a bond line fault is evident.

Clearly more than three layers may be bonded sequentially in the above manner. Alternatively, a triple laminate may be formed by first pressing a tape cast sheet between two layers of Mylar in a press in order to achieve the required top surface smoothness, and thereafter contacting both top and bottom surfaces of this layer with the bottom surfaces of two as-cast layers and thereafter pressing the triple laminate to achieve bonding between the three layers.

Pressing may be carried out at a pressure of from 100 to 1000 psi for a time of about 5 to 60 minutes at temperatures up to about 80° C in order to achieve the desired top surface smoothness, or to achieve bonding between already smooth layers. In general, higher temperatures up to about 80° C increase the plasticity of the layers so that pressing to achieve surface smoothness may be carried out at lower pressures and/or shorter times within the above ranges.

The flexible self supporting laminates can be converted to cemented carbide articles by heating to remove the organic binder and to melt the binder metal to achieve liquid phase sintering. The particular conditions of time and temperature will depend on the particular organic binders present and their amounts, upon the thickness of the article being heated, and upon the particular binder metal and carbide particles employed, as may be appreciated readily by those skilled in the art.

While there has been shown and described what are at present considered the preferred embodiments of the invention, it will be obvious to those skilled in the art that various changes and modifications may be made therein without departing from the scope of the invention as defined by the appended claims.

What is claimed is:

1. A self supporting flexible laminate of at least 3 self supporting flexible tape cast sheets having a composition consisting essentially of from about 70 to about 97 percent by weight of an inorganic portion consisting essentially of discrete particles of (a) from about 75 to 97 weight percent of a refractory metal carbide, and (b) from about 3 to 25 weight percent of a lower melting binder metal, suspended in from about 3 to about 30 weight percent of a solid organic portion, said laminate characterized by having a thickness greater than about 0.080 inches defined by at least two uneroded formed surfaces, and further characterized by having a cross section through said surfaces of substantially uniform appearance across said thickness.

2. An article according to claim 1 wherein at least a portion of said refractory metal carbide is tungsten carbide.

3. An article according to claim 1 wherein at least a portion of the lower melting binder metal is at least one iron group metal selected from the group consisting of iron, cobalt and nickel.

* * * * *